United States Patent [19]

Dabbaj

[11] Patent Number: 4,958,150

[45] Date of Patent: Sep. 18, 1990

[54] DISPLAY DEVICES AND DISPLAY ELEMENTS THEREOF

[76] Inventor: Rad H. Dabbaj, Flat 4, 3 Westbourne Crescent, London, United Kingdom, W2 3DB

[21] Appl. No.: 274,230

[22] Filed: Nov. 18, 1988

[51] Int. Cl.⁵ .............................................. G09G 3/34
[52] U.S. Cl. ..................... 340/783; 340/764; 340/815.27; 340/815.1; 40/476; 40/491
[58] Field of Search ............... 340/752, 755, 763, 764, 340/783, 793, 815.08, 815.09, 815.1, 815.23, 815.24, 815.25, 815.27; 40/445, 482, 488, 486, 491, 598, 476; 350/269, 270

[56] References Cited

U.S. PATENT DOCUMENTS

| | | | |
|---|---|---|---|
| 3,430,371 | 3/1969 | Phillips | 40/486 |
| 4,731,944 | 3/1988 | Honse | 40/491 |
| 4,759,141 | 7/1988 | Aoyagi | 40/488 |
| 4,837,957 | 6/1989 | Egender | 40/491 |

FOREIGN PATENT DOCUMENTS

2229332 12/1974 France .
2197519 5/1988 United Kingdom .

Primary Examiner—Jeffery A. Brier
Attorney, Agent, or Firm—Flehr, Hohbach, Test, Albritton & Herbert

[57] ABSTRACT

A display device comprising a plurality of pixels arranged in a matrix to form a total image display area. Each pixel is comprised of a plurality of sets of two or more vanes with the vanes of each set lying in closely adjacent parallel planes. Driving means is provided for conjointly driving a selected group of corresponding vanes in each set so that the vane forward surfaces are selectively viewable from the front. The vanes in at least one group are colored with a plain color which differs from the color of the vanes in at least one other group.

18 Claims, 4 Drawing Sheets

DISPLAY DEVICES AND DISPLAY ELEMENTS THEREOF

The present invention relates to a display element or a pixel and to a display device comprising a plurality of such elements or pixels, and in particular to a light-reflective display element or pixel with controllable light reflective properties. In the context of the present specification and claims, the term 'pixel' means a dot or element within a display device which forms only a small proportion of the total image display area.

Display devices such as a large-scale picture devices in sports arenas and alpha-numeric display devices at airports and railway stations suffer from a number of disadvantages. For example with light-emitting colour displays such as tricolour displays only a fraction of the surface area is used to provide each colour. To indicate "blue" on a device employing the principle of colour television, less than a third of the available surface area may be used. With devices employing coloured bulbs, even a smaller fraction of the surface area may be used. The displays of mechanical light-reflective display devices employing shutters or flaps can be varied only relatively slowly; in addition the shutters are either visible, in which case they spoil the visual appearance of the display, or hidden behind fixed covers, which reduces the effective surface area of the display.

The present invention seeks to overcome or reduce one or more of the above disadvantages.

In FIG. 6 of FR 2229332 there is disclosed a display device with a plurality of vanes V of one colour which can be selectively pivoted into view in front of fixed vanes G of a second colour. A disadvantage of this arrangement is that pivoting occurs only relatively slowly. In addition, a relatively large radius of pivoting is required to avoid collision between vanes V and G. Moreover in order to fully cover the fixed vanes, the moving vanes need to be eccentrically mounted. Furthermore, not all of the vanes can be viewed from an optimal angle at the same time. Also, a large amount of the surface of the devices of FR 2229332 is constituted by the fixed casing.

According to a first aspect of the present invention there is provided a display device consisting of a plurality of pixels as herebefore defined arranged to form a matrix covering an area, and control means for individually setting the properties of each pixel whereby desired information can be displayed over said area, characterised by light reflective pixels which each comprise a plurality of sets of two or more vanes arranged one behind the other with a forward surface of each set visible from the front, the vanes within each set lying in closely adjacent parallel planes, the sets being also parallel but displaced one behind the other; driving means for individually driving each group formed by corresponding vanes in each set, except the foremost, so that the vane forward surfaces are selectively viewable from the front; each group of vanes being coloured with a respective plain colour different from that of the other group(s).

An advantage of this unit is that it permits extremely flexible colour displays to be provided According to a second aspect of the present invention, there is provided a light reflective display element having a plurality of sets of two or more vanes arranged one behind the other with a forward surface of each set visible from the front, the vanes within each set lying in closely adjacent parallel planes, the sets being also parallel but displaced one behind the other; all those groups formed by corresponding vanes in each set except the foremost being individually drivable so that the forward surfaces of those vanes are selectively viewable from the front; each group of vanes being coloured with a respective plain colour different from that of the other group(s); and driving means capable of positioning the vanes of each drivable group in two extreme positions and also in one or more discrete spaced intermediate position(s).

An advantage of such an arrangement is that the response time of the display element may be very short, e.g. down to 10 milliseconds or less. Because all the vanes are parallel, contact between them is avoided, which could slow down the change of the display or even cause damage. Another advantage is that a plurality of such elements may be assembled to form a display device in which substantially all the surface area contributes to the display. There are substantially no "dead" portions of the display area formed by a fixed casing or by inactive display zones.

Preferably each drivable group of vanes is mounted on a respective support element such as a rod or plate which moves longitudinally parallel to the plane of movement of the vane. This assists very quick actuation of the display element, since it provides a support arrangement with low inertia and reduced air resistance.

Since the vanes in each group have the same colour, an extremely flexible display can be provided with a high speed of operation. Where there are four groups corresponding to black and three primary colours, effects similar to colour television may be provided.

In one preferred manner of operation, the vanes are oscillated at a speed which is too quick for the human eye to see the individual colours. This has the advantage of permitting a wide range of secondary colours to be displayed with any desired brightness, the display being viewable from extremely close range without the basic colours being perceived.

In a preferred method of manufacturing the display element in all the vanes of the display element and support means for the groups are initially manufactured in one piece, the support means then being connected to respective drive means for the respective groups (or to a fixed member if the vanes are fixed vanes), the connections between the support means for the different groups then being severed.

In a preferred method of colouring the display element one group of vanes is made visible and coloured by deposition of paint of a desired colour from the front, and each group is then successively made visible and similarly coloured.

According to a third aspect of the present invention, there is provided a light reflective display element having a plurality of sets of two or more vanes arranged one behind the other with a forward surface of each set visible from the front, the vanes within each set lying in closely adjacent parallel planes, the sets being also parallel but displaced one behind the other; all those groups formed by corresponding vanes in each set except the foremost being individually drivable so that their forward surfaces are selectively viewable from the front; each group of vanes being coloured with respective plain colour different from that of the other group(s).

Preferred embodiments of the present invention will now be described, by way of example only, with reference to the accompanying drawings, of which.

Figure 1:
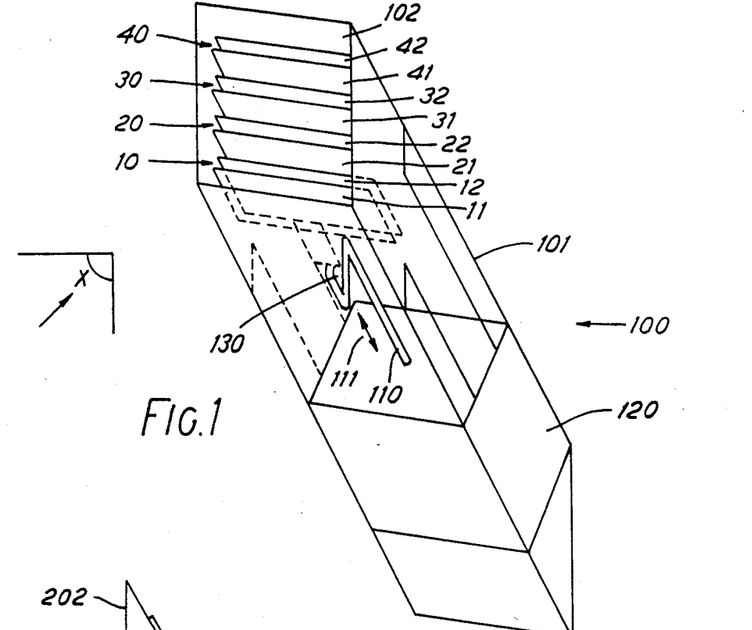
FIG. 1 shows a bottom perspective view of a display element in accordance with a first embodiment of the present invention.

FIG. 1 shows a display element or pixel 100 in accordance with the present invention. The element may be used alone, but usually an array or matrix of immediately adjacent elements 100 arranged in rows and columns will be used to form a large display device. The element comprises a casing 101 with a transparent window 102 at the front. Within the casing adjacent to the window are provided a plurality of rectangular plates or vanes arranged in four sets 10,20,30,40, each set containing two vanes. The front surfaces of corresponding vanes in each set are coloured with the same colour to form a group of vanes. Thus, for example, the group of vanes 11,21,31,41 may be coloured black; this group will be called A1. The front surfaces of the group of vanes 12,22,32,42 will be coloured with a second colour e.g. white; this group will be called A2.

As shown the vanes of group A1 are fixed relative to the casing 101, and the vanes of group A2 are mounted on a plate 130 which in turn is mounted on an axially movable support rod 110. As indicated by the double-headed arrow 111, rod 110 is capable of being reciprocated by an electromagnetic drive means 120. In a preferred arrangement, rod 110 itself constitutes the armature of means 120. In FIG. 1, the group A2 is in the "down" position in which it is completely hidden so that the display appears completely black to an observer looking at the element within the angular range X. When rod 110 moves the group A2 to the "up" position, group A2 is completely revealed and so the display appears completely white. If a single element is used, black front vane 11 or a part of casing 101 may still be visible; where a plurality of elements 100 are used to form a column of a display device, front vane 11 may be arranged to be concealed behind the back vane 42 of the next display element below.

Besides the extreme positions described above, rod 110 may be moved to any intermediate position so that the display may indicate all mixtures of black and white, which, at normal viewing distances, will appear as all shades of grey.

An advantage of the above-described embodiment is that it is capable of operating at high speed. The response time of the drive arrangement 120,110 may be as low as a few milliseconds which enables the display to operate at speeds suitable for real time operation, as in television. The speed of operation may be increased even further by increasing the number of sets of vanes per display element, which reduces the distance which the individual vanes and supports need to move. All movements are in one dimension which also contribute to the high speed of operation, particularly as the cross-sectional area of all moving parts is made as small as possible in the direction of motion to reduce air resistance.

The vanes may lie at any desired angle to the vertical depending upon the location of the display, and the display is clearly visible over a wide viewing angle. The sides of the hidden vanes are blocked from view by the opaque casing, or by a holder for the fixed vanes, or by an adjacent display element in the same row of an array. This arrangement enhances the horizontal viewing angle.

A high contrast ratio is provided even in bright light conditions. The display element is highly reliable and has a long operational life since hinges and cams etc are not required. Manufacture of the display element is simple and cheap and it has a low power consumption and a flexible operating voltage range, avoiding the need for a high voltage supply.

Figure 2:
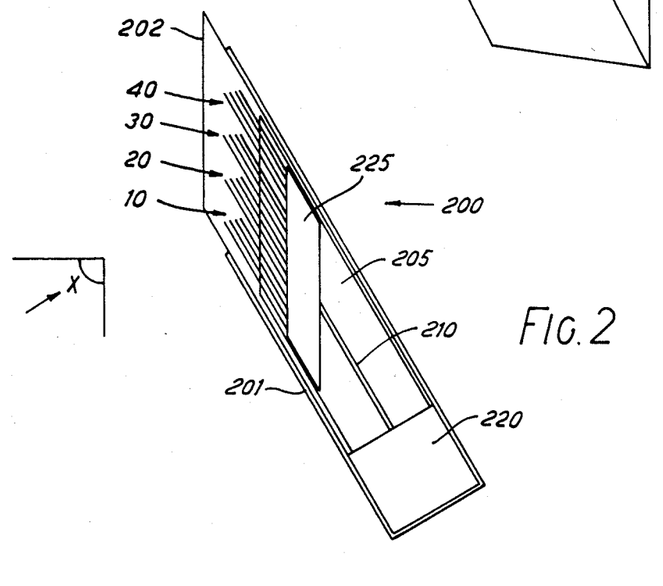
FIGS. 2 and 3 show side views of display elements in accordance with second and third embodiments of the present invention.

FIG. 2 shows a display element 200 in accordance with the present invention. A casing 201 has a transparent front cover 202 and houses a support 205 for the fixed vanes and electromagnetic drive means 220 for a moving-vane support member 225 connected to the drive means 220 by a longitudinally movable rod 210. The vanes are arranged in four sets 10,20,30,40 as in FIG. 1, but in this embodiment each set comprises four vanes. The front vanes of the sets are fixed and together form a group A1 which may be coloured black. The second vanes of the sets have a different colour, e.g. green, and together form a second group A2. Group A2 is mounted on support member 225 and thus driven by means 220. The third vanes of the sets have a further different colour, e.g. red, and form a third group A3. The fourth, i.e. rear, vanes of the sets have yet a different colour, e.g. blue, and form a fourth group A4. Each of groups A3 and A4 has its respective support member, rod and electromagnet drive means (not shown) so that they can be independently actuated.

Accordingly by moving the rods for groups A2, A3, A4 by differing amounts there may be obtained any desired mixture of the colours and thus, at normal viewing distances, any desired hue. Also, by arranging for a particular fraction of the fixed black vanes to remain visible, a wide range of brightness may also be obtained.

Thus in addition to the advantages of the first embodiment, the embodiment of FIG. 2 has the further advantage of colour variation, with the addition of only a single drive means per display element for each primary colour.

Figure 3:
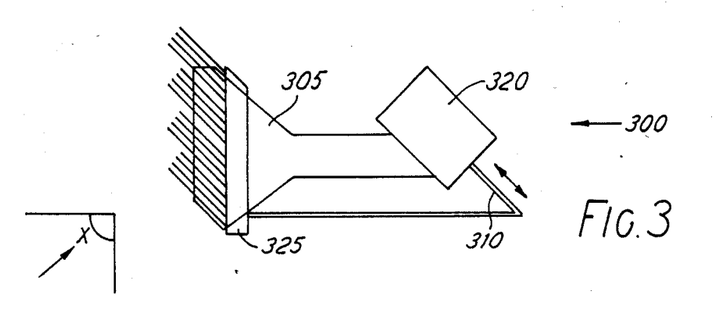

FIG. 3 shows a display element 300 in accordance with the present invention with a support 305 for the fixed vanes and a support 325 for each group of movable vanes. The embodiments of FIGS. 2 and 3 are similar except that in FIG. 3 the respective group of movable vanes is moved downwards as the armature rod 310 is moved in the direction away from the electromagnetic drive means 320. The particular arrangement shown has the advantage of permitting an alternative method of stacking of the display elements; in addition the casing can be substantially rectangular in cross-section.

Figures 4A, 4B, 5, 6:
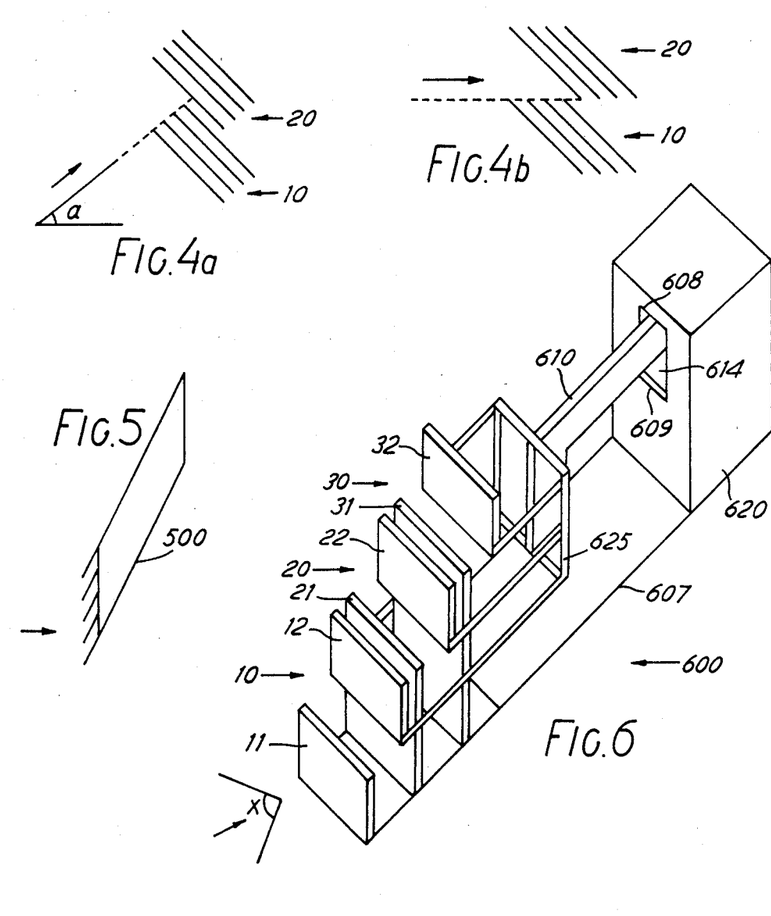
FIGS. 4a and 4b illustrate viewing angles for display elements in accordance with the present invention.
FIG. 5 illustrates a side view of a display element in accordance with a fourth embodiment of the present invention.
FIG. 6 shows a top perspective view of a display element in accordance with a fifth embodiment of the present invention.

FIGS. 4a and 4b show side views of sets 10,20 of display elements and illustrate the viewing angle of the display elements. The vanes are generally inclined in the upwards and forwards direction as in FIGS. 4a and 4b. In this arrangement, since the display is usually viewed from bottom left, no vane edges or gaps between vanes are visible. Thus lower background brightness levels and higher contrast ratios can be obtained. Although inclinations in other directions may alternatively be used, e.g. downwards and forwards as in the display element 500 of FIG. 5, the contrast ratio is inferior unless viewed from the top left.

The number, size, height and thickness of the vanes may be chosen to suit different applications. With reference to FIG. 4a the optimum viewing angle "a" is the angle between the horizon and a line joining the tips of the vanes of a set when they are at minimum or maximum displacement. At this angle the display performs best and the contrast is maximum. The angle "a" may be controlled by shifting the groups relative to each other as shown in 4b, normally during manufacture. Alternatively, or in addition, the inclination angle of the display elements may be adjusted.

A fifth display element 600 in accordance with the present invention is shown in FIG. 6 and comprises a group A1 of fixed vanes 11,21,31 and a group A2 of vanes 12,22,32 movable in their own plane. The vanes are arranged in three sets 10,20,30. The movable vanes A2 are attached to armature 610 of electromagnetic drive means 620, and the fixed vanes A1 are attached to chassis 607. The armature moves up and down within aperture 614 parallel to the planes of the vanes and its displacement is limited by the upper and lower edges 608,609 of the aperture which serve as stop elements, thus ensuring that the moving vanes are completely visible or completely hidden. The stop elements also serve to reduce vibration and oscillation of the armature.

The vanes A2 are attached to armature 610 by means of a frame-like support 625.

Figures 7A, 7B, 7C, 8A, 8B, 8C:
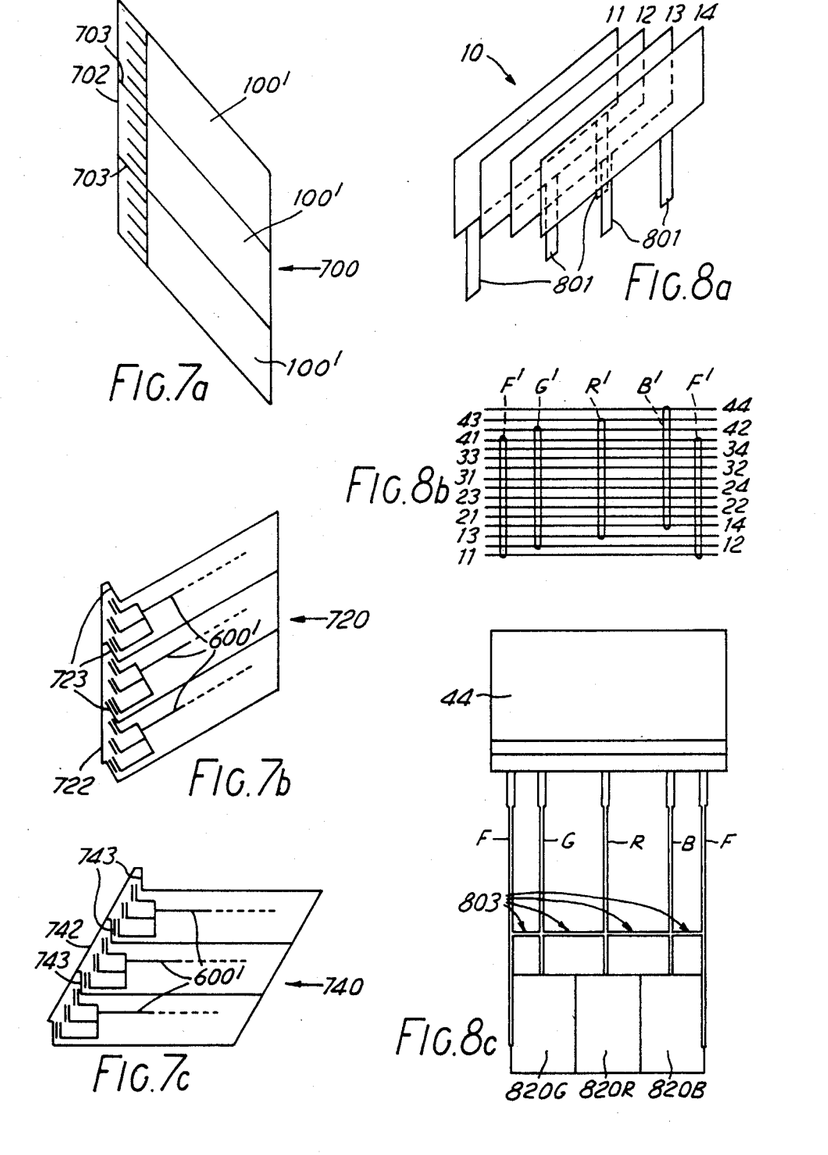
FIG. 7a shows a side sectional view of a display device comprising three display elements of the type showm in FIG. 1.
FIGS. 7b and 7c show side sectional views of two display devices formed by combining display elements according to FIG. 6.
FIGS. 8a, 8b and 8c show steps in the method of constructing a vane assembly for display elements in accordance with the present invention.

FIG. 7a is a side sectional view of a device 700 comprising three rows of display elements or pixels 100' similar to element 100 or 200 whereby the three elements in combination form a matrix.

FIGS. 7b and 7c are side sectional views of display devices 720,740 each comprising three rows of display elements 600' similar to element 600. The vanes of the three devices are arranged to face in different directions, depending upon the desired angle of view.

The devices have transparent front covers 702,722,742. If a single display element 600 is used, it will be seen from FIG. 6 that fixed vane 11 is always visible which reduces the flexibility of the display. However, where a plurality of display elements are arranged in a column, this disadvantage is avoided or at least considerably reduced by the top movable vane of one display element being arranged to selectively cover the bottom fixed vane of the display element immediately above. The casing walls at positions 703,723,743 may be clear or opaque. If they are clear, the fixed vanes behind them are clearly visible when the moving vane in front is in the "down" position. If they are opaque, they are arranged to be the same colour as the fixed vanes. As an alternative, a plurality of elements may share a common casing and front transparent cover, in which case the walls at positions 703,723,743 may be omitted.

An advantage of the display devices of FIGS. 7a,7b and 7c is that substantially all of their display areas are active. A further advantage is that the vanes may be inclined at any desired angle to permit optimum viewing; in view of the transparent covers 702,722,742, there is no danger of rain or dust entering the gaps between the vanes.

FIGS. 8a,8b and 8c illustrate a covenient method of manufacturing assemblies of vanes for use in display elements according to the present invention. The vanes are mounted on support legs 801, see FIG. 8a which illustrates a set 10. The legs 801 are attached to respective plates (F',G',R',B') as follows. The vanes in the fixed group A1 each have two legs which are attached to the chassis by fixed plates F'. The vanes in the second group A2 each have a single leg connected to a plate G' (for green). Similarly the vanes in the third and fourth groups A3,A4 are respectively connected to plates R' (for red) and B' (for blue). The plates F',G',R',B' are respectively connected to rods F,G,R,B which are interconnected by intermediate bars 803. All the vanes 11–44, the legs 801, the plates F',G',R',B', the rods F,G,R,B and the bars 803 are preferably made in one piece by casting, moulding, injection moulding or machining; this enables them to be accurately aligned from the start. After manufacture this integral assembly is fixed to three electromagnetic drive means as follows. The two rods F are fixed to the chassis. Rods G, R and B are respectively fixed to the armatures of electromagnetic drive means 820G, 820R, 820B already fixed relative to each other. The bars 803 are then severed, e.g. by machine or laser cutting to separate the groups of vanes so that they are independently actuable. The above described procedure may be expanded to the simultaneous manufacture of a plurality of display elements from a single one-piece assembly.

In the case of separately manufactured and subsequently assembled vanes, the vanes may be printed before assembly. Where vanes are manufactured together, as described in the preceding paragraph, painting is advantageously effected by spraying in the direction of the optimum viewing angle "a". The colours are painted in turn. This is done by fully activating one electromagnet drive means, thus exposing a single group of vanes, and then spraying the display element with the desired colour. The electromagnetic drive is deactivated and the sequence is repeated for the other colours. Finally the display element is sprayed with the background colour (usually black) while all the electromagnetic drives are de-activated.

The electromagnetic drive means for the above-described display elements may be of various types. They may be monostable (e.g. having a spring loaded armature with one stable state), polarised, or bistable (in which the armature can be magnetically latched into either of two positions). Alternatively multi-stable electromagnetic drive means may be employed, so that the vanes can occupy intermediate positions.

Figure 9A:
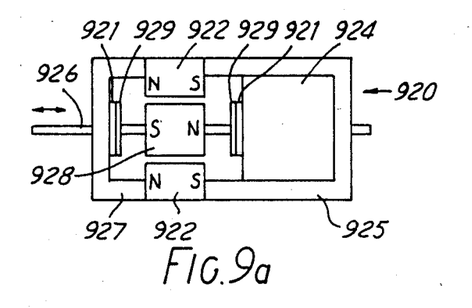
FIGS. 9a to 9f show schematic views of six drive means for display elements according to the present invention.

FIG. 9a shows a three-state electromagnetic device 920 comprising yokes 925 and 927, pole pieces 921, washer springs 929, fixed permanent magnets 922 and a solenoid coil 924 having an armature 926 upon which is mounted a further permanent magnet 928. With the solenoid coil 924 fully excited to repel the magnet 928, the attractive forces of magnets 922 are overcome and the armature moves fully to the left. With the solenoid coil 924 fully excited to attract the magnet 928, the armature moves fully to the right. If the armature is at its extreme right position and it is desired to move it to its third position, i.e. in the middle, the coil 924 is excited to repel the magnet 928 for a period of time long enough to move magnet 928 into the position showing where it is in alignment with magnets 922, but no further. The magnet 928 will then be held in the middle position by the forces of magnets 922.

Figure 9B:
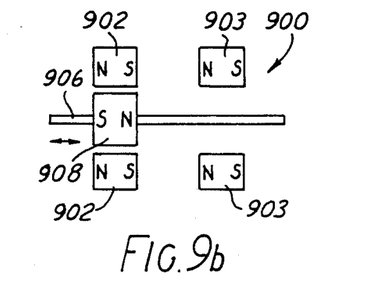

FIG. 9b shows the armature 906 of a four-state electromagnetic drive device 900 similar to device 920 but with two sets of permanent magnets 902, 903 to interact with permanent magnet 908 to give two stable middle positions in addition to the two end positions. In FIGS. 9a and 9b, the fixed permanent magnets 922, 902,903 may be replaced by magnetic members which are not permanently magnetized.

Figure 9C:
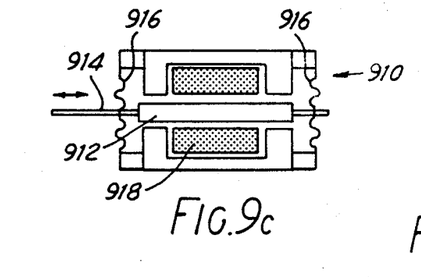

FIG. 9c shows a multi-stable device 910 with a freely suspended solenoid core 912. The core is supported in wave springs 916 and armature 914 constitutes, or is connected to, the actuating rod for a group of vanes. The moving members of the device 910 are firmly connected to the springs 916, which also prevents the members from rotating about their axis. The core can be located in an analogue or continuous manner in any desired position by appropriate excitation of the solenoid coil 918, i.e. by varying the magnitude of the current or voltage to the coil or by varying the duty cycle ratio.

Figure 9D:
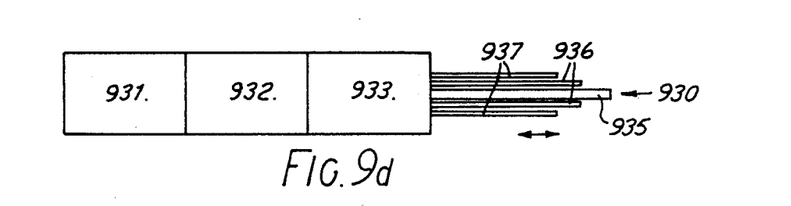

FIG. 9d shows an electromagnetic device 930 which enables electromagnetic devices 931,932 and 933 to be positioned directly behind each other rather than side by side. The devices have respective armatures 935,936 and 937. At least devices 932 and 933 are tubular so that the armatures of the rear devices may pass through the centre thereof. As shown, the armatures are also tubular, but alternatively they may be arranged side-by-side. The arrangement of FIG. 9d permits very close stacking of the display elements The electromagnetic devices 931,932 and 933 are preferably magnetically shielded from each other.

Figure 9E:
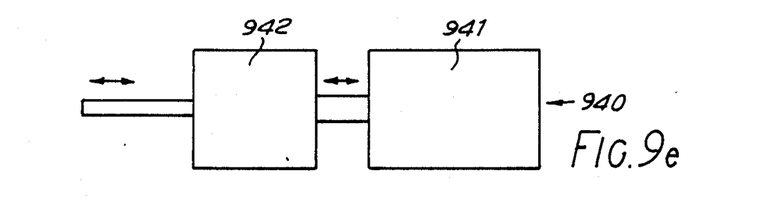

FIG. 9e shows an electromagnetic device 940 having two solenoids of which one 942 is mounted on the armature of the other 941. This constitutes a four state device. Similar mounting techniques may be used to combine any number of solenoids to obtain a desired number of states.

Any electromagnet with some restraining device like a spring may be used to operate in an analogue mode i.e the displacement may have a substantially continuous range of levels. By changing the energisation duty cycle ratio, all of those levels may be obtained. One example is a voice-coil-type electromagnet, as shown at 950 in FIG. 9f. This is similar to the electromagnetic device of FIG. 9c. A combination of a voice-coil-type electromagnet and light-weight vanes provides a display capable of operating at fast speeds. The wave spring 951 shown is made of a perforated light-weight material. An upper spring 952 may also be provided to oppose any tendency for lateral displacements. Besides operating in an analogue or continuous fashion, the electromagnet may be operated to adopt one of a discrete number of states, i.e. digitally.

Figure 9F:
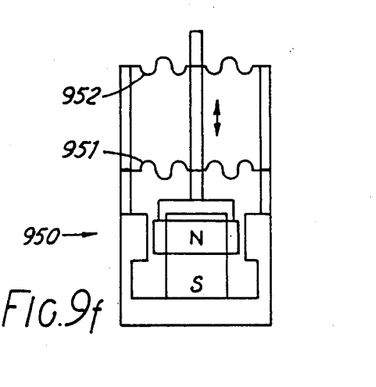

The stiffness of the spring 951 may be chosen so that full power is only required when changing from one state to another.. at high speed. Only a fraction of the full power is necessary for maintaining a state once achieved.

Many modifications may be made to the above-described embodiments.

The vanes can be operated statically or dynamically. In the static mode each movable vane is stationary for relatively long periods between movements. By activating one electromagnet at a time, only the colour of the vanes attached to that electromagnet is displayed. By activating more than one electromagnet at the same time such that two or more primary colours are displayed, secondary colours are produced provided the viewing distance is long enough for the human eye to mix the two primary colours into one secondary. For secondary colours, the minimum number of electromagnet states required is three, since an intermediate state is necessary to partially display the vanes.

The dynamic mode of operation is similar to the static mode, except that the colours are refreshed continuously at a speed too fast for the human eye to follow. This is similar to colour T.V. operation, and the frequency of operation may be 25 to 60 Hz. In the dynamic mode, a much greater number of intermediate levels is possible by appropriate duty cycle modulation of the electromagnetic drive means. To give an example, assume the fixed group of vanes is black and that there are three groups of movable vanes corresponding to the three primary colours. A primary colour is displayed by exposing the corresponding vanes for a time depending on the desired strength of that colour, and then repeating this at 25 to 60 times per second. If the vanes are exposed for the entire cycle the colour is strong; if exposed for a less time a lower brightness level of that colour is produced. If more than one primary colour is exposed during the period, the eye will see a colour representing the mixture of the total effective exposure of the activated primaries. Thus to display yellow, only the red and green vanes are activated in a fast repeated sequence. The human eye will see a yellow colour rather than the separate red and green, and the shade of yellow will depend upon the relative times for which the red and green vanes are exposed This "flutter" technique may be applied to a wide range of display elements.

If the frequency of the drive pulses or signals increases beyond the response time of the drive arrangement, the display element reverts to the static mode, with the position of the movable vanes corresponding to the average value of the applied signal.

The speed of display elements in accordance with the present invention may be further increased by operating them in a vacuum. Although stop members have been described only in connection with FIG. 6, stop members may be provided for the drive arrangements of any other of the embodiments to achieve quick and accurate positioning of the vanes and to reduce vibration.

One or more of the groups of vanes may be fluorescent or phosphorescent, especially for night-time use. Instead of or in addition to colour variations, the vanes may carry different patterns, e.g. parallel grooves extending in different directions on different groups, or different surface finishes, e.g. matt or shiny.

In all the embodiments described above, the surface of each vane is substantially uniform However, the vanes in a group may instead carry detailed segments of a required image, so that one display element or an array of display elements provides a complete image. This is of particular application in repeatedly changing advertising displays. Another possible application is in changing traffic signs such as those comprising images of a pedestrian walking or standing. The configuration with no power supplied to the drive means is arranged to show the "safe" display, i.e. the picture of the standing position in the example above; thus, should the electrical supply be interrupted, the device fails safe. This is a considerable advantage over conventional traffic signs employing bulbs or other light-emitting devices.

An alternative form of electromagnetic drive means which may be employed is a small motor driving a lead screw around which is a threaded nut coupled to a group of vanes. The displacement of the vanes is controlled by the angular rotation of the motor shaft and the pitch of the screw and nut. The motor may provide a continuous output or it may be a stepping motor which provides a discrete or digital output.

In all embodiments of the present invention, shielding may be provided between the individual electromagnetic drive means to reduce the effect of stray magnetic and electric fields and the risk of incorrect operation of the vanes.

As an alternative to electromagnetic drive devices, electrostatic, piezoelectric, hydraulic, pneumatic or any other suitable drive arrangement may be used.

A computer may be used to coordinate the operation of all the display elements in a large display comprising a large plurality of rows and columns of display elements. It may be used to control brightness and contrast, the selection of colours, and the optimum viewing angle for viewers located at a particular location. In addition it may store images to be displayed, collect feed-back information, and collect data relating to any error occurring. In static displays, the computer controls the brightness by controlling the displacement of the vanes. In dynamic displays, the computer controls both the displacement and the length of time for which this displacement is maintained; i.e. brightness is related to the product of the area of the vanes exposed and the average time of exposure. Both these quantities can be directly controlled by duty cycle modulation, but it should be noted that the response of the display may not be linear. The computer, which may comprise a Read Only Memory (ROM), may be used to determine the correct duty cycle ratio. Information relating to the display response characteristics of a typical display element, or for each element in a large array or screen, may be stored in the computer. Desired brightness gradation levels are constantly fed to the computer, which evaluates the correct duty cycle ratio in accordance with the element characteristics. These characteristics may need to be updated during the life of the display. The response time of the armatures, i.e. the time taken to move to maximum displacement, may be very short, e.g. down to a few miliseconds or less; this enables the computer to operate the display at speeds suitable for real time operation, as in television.

Instead of a substantially continuous display, the display elements may be arranged to constitute the different segments of a seven segment character display unit. A dot matrix type of display unit may also be formed with the individual reflective areas of the vanes being of square, circular, rectangular or honeycomb shape.

When used to form a large screen display device, capable of producing high quality images similar to those of colour television, each display element displays one dot of the whole picture. The large screen display is particularly suited to outdoor applications where strong daylight or sunlight is a great advantage, rather than a disadvantage as with many existing display devices. The display may be illuminated at night if required. Some of the applications envisaged are: advertising, message display, scoreboards for sports stadia, cinemas and very large screen televisions.

In the embodiment of FIG. 6, arm 610 may be pivotally mounted at its end within the electromagnetic drive means 620. This means that the movable vanes travel in a slight arc. The vanes may be slightly curved around a horizontal axis to maintain a constant separation between them. Since the sets of vanes 10,20,30 lie one behind the other, a simple drive arrangement suffices, without the need for an eccentric or any other complicated drive. Each vane lies on its own individual concentric circle.

In all embodiments of the present invention the vanes may be curved around a vertical axis to improve the horizontal viewing angle.

In all the described embodiments of the invention, one group of vanes is fixed; however if desired all groups may be movable.

It is envisaged that a display element according to the invention may comprise only one set of vanes.

With colour display elements, the preferred number of groups is four, corresponding to black and the three primary colours. In a modification there are five groups, with white being added to the above colours. However, any desired number of groups may be provided from two upwards, and secondary colours and/or vanes with different patterns or surface finishes may be used in addition to or instead of the primary colours. In addition any number of sets may be provided per display element; for a given size of display element the more sets there are, the smaller is the necessary displacement and the quicker is the actuation of the vanes.

The display elements may each incorporate a switch actuated by the displacement of the armature. Such a switch provides a facility for confirming details of the message etc displayed, which is particularly useful for bank and stock exchange applications. The switch may employ relay-type contacts.

Display elements in accordance with the present invention are relatively inexpensive and simple to manufacture and are reliable and long-lasting in operation.

I claim:

1. A display device comprising a plurality of pixels arranged to from a matrix covering an area, and control means for individually setting the properties of each pixel whereby desired information can be displayed over said area, characterised by light reflective pixels which each comprise a plurality of sets of two or more vanes arranged one behind the other with a forward surface of each set visible from the front, the vanes within each set lying in closely adjacent parallel planes, the sets being also parallel but displaced in parallels planes; driving means for conjointly driving a selected group of corresponding vanes in each set, except the foremost, so that the vane forward surfaces are selectively viewable from the front; the vanes in at least one group being colored with a respective plain color which is different from that of the vanes in at least one other group.

2. A display device as claimed in claim 1 which has a plurality of sets of four vanes, the three movable groups each being colored with a plain color different from that of the other groups.

3. A display device as claimed in claim 1 or 2 wherein the colors are primary colors.

4. A display device according to claim 1 wherein each drivable group of vanes is mounted on a respective support element which moves parallel to the plane of movement of the vanes and to its axis.

5. A display device according to claim 1 wherein each drivable group of vanes is mounted on a respective support element which moves laterally substantially parallel to the plane of movement of the vanes.

6. A display device according to claim 5 wherein the support element pivots at a distance from the vane.

7. A display device according to any of claims 1 or 2 or 4 or 5 or 6, wherein the vanes of each drivable group can occupy two extreme positions and are continuously drivable by the driving means to any intermediate position.

8. A display device according to any of claims 1 or 2 or 4 or 5 or 6 wherein each drivable group of vanes can be oscillated by the driving means at a speed which is too quick for the human eye to follow.

9. A display device according to any of claims 1 or 2 or 4 or 5 or 6 wherein the vanes of each drivable group can occupy two extreme positions and also one or more discrete spaced intermediate position(s).

10. A display device according to claims 1 or 2 or 4 or 5 or 6, wherein each movable group of vanes is driven by an electromagnetic driving means.

11. A display device according to claims 1 or 2 or 4 or 5 or 6 wherein a vane of at least one pixel is arranged to conceal at least part of a vane of an adjacent pixel.

12. A display device according to claims 1 or 2 or 4 or 5 or 6 wherein the area lies in a plane, and the front surfaces of the vanes lie at an acute angle to said plane, such that with the plane positioned vertically the normals to the front surfaces point downwards and forwards.

13. A light reflective display element having a plurality of sets of two or more vanes arranged one behind the other with a forward surface of each set visible from the front, the vanes within each set lying in closely adjacent parallel planes, the sets being also parallel but displaced one behind the other; all those groups formed by corresponding vanes in each set except the foremost being individually drivable so that the forward surfaces of those vanes are selectively viewable from the front; each group of vanes being coloured with a respective plain colour different from that of the other group(s); and driving means capable of positioning the vanes of each drivable group in two extreme positions and also in one or more discrete spaced intermediate position(s).

14. A light reflective display element as claimed in claim 13 which has a plurality of sets of four vanes, the three movable groups being coloured with a plain colour different from that of the other groups.

15. A light reflective display element as claimed in claim 13 or 14 wherein the colours are primary colours.

16. A light reflective display element having a plurality of sets of two or more vanes arranged one behind the other with a forward surface of each set visible from the front, the vanes within each set lying in closely adjacent parallel planes, the sets being also parallel but displaced one behind the other; all those groups formed by corresponding vanes in each set except the foremost being individually drivable so that their forward surfaces are selectively viewable from the front each group of vanes being coloured with respective plain colour different from that of the other group(s).

17. A method of manufacturing a light reflective display element according to claims 13 or 14 wherein all the vanes of the display element and support means for the groups are initially manufactured in one piece, the support means then being connected to respective drive means for the respective groups (or to a fixed member if the vanes are fixed vanes), the connections between the support means for the different groups then being severed.

18. A method of colouring a light reflective display element according to claims 13 or 14 wherein one group of vanes is made visible and coloured by deposition of paint of a desired colour from the front, and each other group is then successively made visible and similarly coloured.

* * * * *

REEXAMINATION CERTIFICATE (1990th)

United States Patent [19]

Dabbaj

[11] B1 4,958,150

[45] Certificate Issued  Apr. 27, 1993

[54] DISPLAY DEVICES AND DISPLAY ELEMENTS THEREOF

[76] Inventor: Rad H. Dabbaj, Flat 4, 3 Westbourne Crescent, London, United Kingdom, W2 3DB

Reexamination Request:
No. 90/002,448, Sep. 27, 1991

Reexamination Certificate for:
Patent No.: 4,958,150
Issued: Sep. 18, 1990
Appl. No.: 274,230
Filed: Nov. 18, 1988

[51] Int. Cl.$^5$ ............................................. G09G 3/34
[52] U.S. Cl. ................................... 340/783; 340/764;
340/815.27; 340/815.1; 40/476; 40/491
[58] Field of Search ............... 340/752, 755, 763, 764,
340/783, 793, 815.08, 815.09, 815.1, 815.23,
815.24, 815.25, 815.27; 359/227, 230; 40/445,
482, 486, 491, 476, 598

[56] References Cited

U.S. PATENT DOCUMENTS 4,983,956  1/1991  Salam ............................ 340/783

FOREIGN PATENT DOCUMENTS 56-150786  11/1981  Japan .
WO8504506  10/1985  PCT Int'l Appl. .
350958  6/1931  United Kingdom .

*Primary Examiner*—Jeffery A. Brier

[57] ABSTRACT

A display device comprising a plurality of pixels arranged in a matrix to form a total image display area. Each pixel is comprised of a plurality of sets of two or more vanes with the vanes of each set lying in closely adjacent parallel planes. Driving means is provided for conjointly driving a selected group of corresponding vanes in each set so that the vane forward surfaces are selectively viewable from the front. The vanes in at least one group are colored with a plain color which differs from the color of the vanes in at least one other group.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEEN DETERMINED THAT:

Claims 2 to 12, 14 and 15 are cancelled.

Claims 1, 13, 16, 17 and 18 are determined to be patentable as amended.

New claims 19 to 33 are added and determined to be patentable.

1. A display device comprising a plurality of *light reflective* pixels arranged *in a regular matrix of rows and columns so as to cover a display* [to from a matrix covering an] area[, and] *with substantially no dead portions thereof, each pixel having its properties individually settable in one of at least two reflective states*, control means for individually setting [the] *said* properties of *the respective individual pixels* [each pixel] whereby desired information can be displayed over *the whole of* said area *in the form of dot-matrix patterns*, [characterised by light reflective pixels which each comprise] *the pixels of said matrix each having* a plurality of sets of two or more vanes arranged one behind the other with a forward surface of each set visible from the front, the vanes within each set lying in closely adjacent parallel planes, the sets being also parallel but displaced [in parallels planes] *one behind the other*; driving means for [conjointly] *individually* driving [a selected group of] *each group of vanes, except the foremost, with each such group of vanes being formed by* corresponding vanes in each set, [except the foremost, so that the] *whereby the* vane forward surfaces are selectively viewable from the front; [the vanes in at least one] *each* group *of vanes* being colored with a respective plain color which is different from that of the vanes in at least one other group.

13. A light reflective display element having a plurality of sets of two or more vanes arranged one behind the other with a forward surface of each set visible from the front, the vanes within each set lying in closely adjacent parallel planes, the sets being also parallel but displaced one behind the other; [all those groups] *driving means for individually driving each group of vanes except the foremost, with each group of vanes being* formed by corresponding vanes in each set [except the foremost being individually drivable so that the] *whereby the vane* forward surfaces [of those vanes] are selectively viewable from the front; each group of vanes being coloured with [a] respective plain colour different from that of the other group(s); [and] *said* driving means *being* capable of positioning the vanes of each drivable group in two extreme positions and also in one or more [discrete spaced] intermediate position(s).

16. A light reflective display element having a plurality of sets of [two] *three* or more vanes arranged one behind the other with a forward surface of each set visible from the front, the vanes within each set lying in closely adjacent parallel planes, the sets being also parallel but displaced one behind the other; [all those groups] *driving means for individually driving each group of vanes, except the foremost, with each group of vanes being* formed by corresponding vanes in each set [except the foremost being individually drivable so that their] *whereby the vane* forward surfaces are selectively viewable from the front; each group of vanes being coloured with respective plain colour different from that of the other group(s).

17. A method of manufacturing a light reflective display element according to claims [13 or 14] *13, 16, 19, 20 or 21*, wherein all the vanes of the display element and support means for the groups are initially manufactured in one piece, the support means then being connected to respective drive means for the respective groups (or to a fixed member if the vanes are fixed vanes), the connections between the support means for the different groups then being severed.

18. A method of colouring a light reflective display element according to claims [13 or 14] *13, 16, 19, 20 or 21*, wherein one group of vanes is made visible and coloured by deposition of paint of a desired colour from the front, and each other group is then successively made visible and similarly coloured.

*19. A light reflective display element or pixel as claimed in claim 13 in which said intermediate position is a pre-defined discrete position or in which said intermediate positions are pre-defined discrete positions.*

*20. A light reflective display element or pixel as claimed in claim 13 in which said driving means is capable of analog fashion displacement to set the vanes in any desired position intermediate the two extreme positions.*

*21. A light reflective display element or pixel as claimed in claim 13 wherein said plurality of sets each contains at least three vanes.*

*22. A light reflective display element or pixel as claimed in claims 13 or 16 wherein the plain colors each comprise one of three primary colors.*

*23. A light reflective element or pixel as claimed in claims 13 or 16 wherein the plain colors each comprise one of three primary colors and additionally white or black.*

*24. A light reflective display element or pixel as claimed in claims 13, 16, 19, 20 or 21 wherein each drivable group of vanes is mounted on a respective elongated support element which moves parallel to the plane of movement of the vanes and to its axis.*

*25. A light reflective display element or pixel as claimed in claims 13, 16, 19, 20 or 21 wherein each drivable group of vanes is mounted on a respective elongated support element which moves laterally substantially parallel to the plane of movement of the vanes.*

*26. A light reflective display element or pixel as claimed in claims 13, 16, 19, 20 or 21 wherein the support element pivots at a distance from the vane.*

*27. A light reflective display element or pixel as claimed in claims 13, 16, 19, 20 or 21 wherein each drivable group of vanes can be oscillated by the driving means at a speed which is too quick for the human eye to follow.*

*28. A light reflective display element or pixel as claimed in claims 13, 16, 19, 20 or 21 wherein each driving means is electromagnetic.*

*29. A light reflective display element or pixel as claimed in claims 13, 16, 19, 20 or 21 wherein each driving means* is electromagnetic having one or more latching position(s) for at least one of the groups of vanes.

30. A display device comprised of a plurality of light-reflective pixels arranged in a regular matrix of rows and columns so as to cover an area, each pixel having its properties individually settable in one of at least two reflective states, control means for individually setting said properties of the respective individual pixels whereby desired information can be displayed over said area in the form of dot-matrix patterns, the pixels of said matrix each having a plurality of sets of three or more vanes arranged one behind the other with a forward surface of each set visible from the front, the vanes within each set lying in closely adjacent parallel planes, the sets being also parallel but displaced one behind the other; driving means for individually driving each group of vanes, except the foremost, with each such group of vanes being formed by corresponding vanes in each set, whereby the vane forward surfaces are selectively viewable from the front; each group of vanes being colored with respective plain color different from that of the other group(s).

31. A display device comprised of a plurality of light-reflective pixels arranged in a regular matrix of rows and columns so as to cover an area, each pixel having its properties individually settable in one of at least three reflective states, control means for individually setting said properties of the respective individual pixels whereby desired information can be displayed over said area in the form of dot-matrix patterns, the pixels of said matrix each having a plurality of sets of two or more vanes arranged one behind the other with a forward surface of each set visible from the front, the vanes within each set lying in closely adjacent parallel planes, the sets being also parallel but displaced one behind the other; driving means for individually driving each group of vanes, except the foremost, with each such group of vanes being formed by the corresponding vanes in each set, whereby the vane forward surfaces are selectively viewable from the front, said driving means being capable of positioning the vanes of each drivable group in two extreme positions and also in one or more intermediate position(s); each group of vanes being colored with respective plain color different from that of the other group(s).

32. A display device as claimed in claims 1, 30 or 31 wherein a vane of at least one pixel is arranged to conceal at least part of a vane of an adjacent pixel.

33. A display device as claimed in claims 1, 30 or 31 wherein the area lies in a plane, and the front surfaces of the vanes lie at an acute angle to said plane, such that with the plane positioned vertically the normals to the front surfaces point downwards and forwards.

* * * * *